Jan. 5, 1960
H. B. SCHULTZ
2,919,681
REACTION LIMIT CONTROL VALVE
Filed July 18, 1955
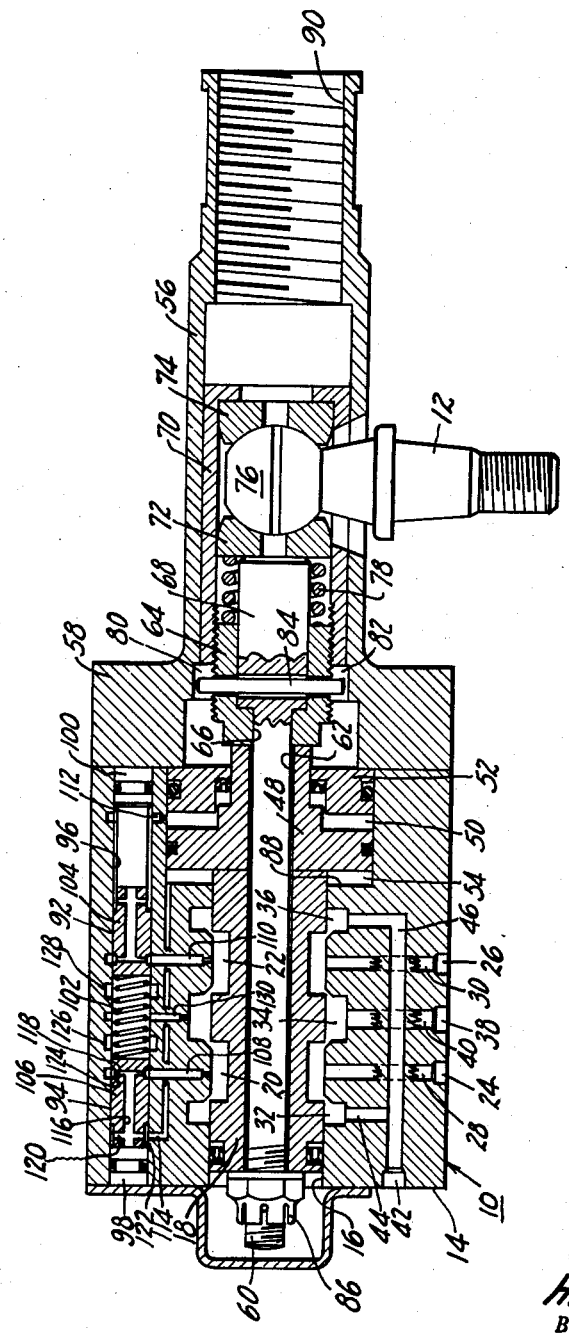
INVENTOR.
HAROLD B. SCHULTZ
BY
William N. Antonis
ATTORNEY United States Patent Office 2,919,681
Patented Jan. 5, 1960

2,919,681
REACTION LIMIT CONTROL VALVE

Harold B. Schultz, South Bend, Ind., assignor to Bendix Aviation Corporation, South Bend, Ind., a corporation of Delaware Application July 18, 1955, Serial No. 522,587

3 Claims. (Cl. 121—46.5)

The present invention relates to fluid power steering, and more specifically to improvements in a control valve for such mechanism.

Most power steering systems provide for a certain amount of "reaction effect" in order to transmit the desired "feel" to the operator of the vehicle. Where spool type control valves are used, one method of providing "feel" is to subject predetermined reaction areas on each end of the spool to the working pressures in the servo. With this type of control valve, if larger reaction areas are desired to increase the "feel" for a given pressure, the spool and housing must also be proportionally increased. As a result, an increase in reaction areas means an increase in the diameter of the valve spool and hence the valve housing.

It is therefore an object of this invention to provide a control valve having reaction areas the size of which have no effect on the size of the spool.

Another object of this invention is to provide a control valve having a small spool and valve body with reaction means having a relatively large reaction effect.

A further object of the invention is to provide a control valve of the reaction type for power steering wherein the hydraulic pressure creating the reaction is directed to opposite sides of a reaction member situated at one end of the valve spool.

A still further object of this invention is to provide a control valve for a power steering system having a reaction member on one end of the spool which provides both "feel" and means for manually steering a vehicle in the event of power failure.

The above and other objects and features of the invention will be apparent from the following description of the apparatus taken in connection with the accompanying drawing which forms a part of this specification.

Referring now to the single figure of the drawing, the numeral 10 designates a control valve for a power steering system which is actuated through ball stud 12. The ball stud is operatively connected to a steering shaft which is not shown. The control valve is comprised of a housing member 14 having a bore 16 therein and a valve member 18 lying within the bore. The valve member is movable in opposite directions from a normally neutral or center position, thereby controlling flow in the hydraulic system. The valve member 18 is formed with two annular channels 20 and 22 which communicate with cylinder ports 24 and 26 through passages 28 and 30. The bore of the valve housing is provided with annular channels 32, 34 and 36. Annular channel 34 is in communication with a return port 38, by way of passage 40. Annular channels 32 and 36 communicate with an inlet port 42 through passages 44 and 46. The control valve shown is an open center type valve which in neutral position allows free flow of the hydraulic fluid between the inlet port 42 and the return port 38 via the annular channels which are arranged in overlapping relationship.

As previously stated, reaction areas are often located on the ends of the valve spools. Increasing these reaction areas will increase the "feel" but will also increase the size of the valve spool and housing. I have overcome this problem by providing a separate reaction member 48 which is associated with the valve spool 18. By using such a separate reaction member, it is possible to increase the reaction areas for a given control valve without increasing the size of the valve spool and housing.

The reaction piston 48 is located at one end of the valve member 18 forming reaction chamber 50 with the sealed bushing 52 and reaction chamber 54 with the housing 14. These reaction chambers are in effect hydraulic pressure reaction means built into the control valve in order to oppose relative movement of the valve and housing members away from their neutral position. In other words, the hydraulic pressures communicated to these chambers act on either side of the reaction piston 48 tending to oppose relative movement of the valve member 18 from neutral and to restore it to neutral when such movement occurs. The pressures in the reaction chambers oppose movement of the valve member with a force equal to the effective areas of the movable walls multiplied by the unit pressure in the chambers. This force which is in the form of a reaction force is transmitted to the operator of the vehicle through the ball stud 12.

The sealed bushing 52 is held in position by an outer sleeve 56 having a flange 58 abutting the valve housing 14. The valve member 18 is operatively connected to the ball stud 12 for sliding movement in the bore. The connection to the stud is an assembly of parts comprising a bolt 60, extending through a central passage 62 of the valve member, a bushing 64 having an opening 66 therein which passes the small diameter of the bolt but not the enlarged end 68, an inner sleeve 70 to which bushing 64 is screwed, members 72 and 74 providing sockets for a spherical end 76 of the stud, and anti-rattling spring 78. The iner end of the sleeve 70 is slotted at 80 and 82 to receive the ends of pin 84 thereby preventing rotation of the assembly in the bore. The pin 84 passes through the bushing 64 and enlarged end 68 of the bolt 60 in order to prevent the latter from turning when the nut 86 is threaded thereon. With nut 86 tightened down against the end of the valve member, movement of the ball stud will cause the valve member and assembly to move as a unit in the housing 14 and sleeve 70.

Note that reaction piston 48 will engage the side of sealed bushing 52 when the valve member 18 is moved to the right and a shoulder 88 within the valve housing when the valve member is moved to the left. This positive engagement between the above mentioned members provides stop means and permits manual steering after a predetermined movement of the valve member in the event of power failure. Incorporation of the stop means with the reaction member obviates the necessity for having separate stop means to provide for manual steering should power failure occur. The end of sleeve 56 is internally threaded at 90 so that it may be connected to an appropriate part of the steering linkage of the vehicle.

Regulating valve means 92 and 94 control the pressures in reaction chambers 50 and 54 respectively. If the pressure build up in the system required to overcome the resistance offered to steering becomes sufficiently great, that is, of the pressure exceeds a predetermined value, the regulating valves will come into action, shutting off communication to the reaction chambers. In this manner, a proportionally increasing "feel" is provided up to a predetermined pressure and a constant "feel" thereafter. The regulating valves are arranged in a bore 96 of the housing member. Plugs 98 and 100 close the ends of the bore against leakage to atmosphere. A spring 102 arranged between the adjacent ends of the valve elements 104 and 106 urges the respective elements against the plugs 98 and 100. The spring is preloaded between these valve elements and will be overcome when the pressure acting over the areas of the valve elements adjacent the plugs exceeds the predetermined value established by the spring loading. Passages 108 and 110 connect annular channels 20 and 22 with the bore. Passages 112 and 114 connect the reaction chambers 50 and 54 respectively with the bore 96.

Since the valve elements 104 and 106 are identical, only one will be described. An axial passage 116 connects radial passage 118 with radial passage 120. The outer end 122 of each valve element is of reduced diameter so that the ends of the valve elements will not hinder communication with passages 112 and 114. The radial passage 118 terminates at its outer end in an annular groove 124 formed in the exterior surface of the element. The axial width of the groove 124 of each element is less than the axial distance between adjacent edges of passages 108 and counterbore 126, on the one hand and passage 110 and counterbore 128, on the other hand. A passage 130 connects bore 96 with annular channel 34, which is connected to the return port 38. With the valve elements shifted inwardly against the spring 102 so that the edges of the groove of each element lie between the adjacent edges of the passages 108 and 110 and the counterbores 126 and 128 respectively, communication to the reaction chambers 50 and 54 is cut off. Any further shifting inwardly of the valve elements so that the edge of the groove of each element overlaps the edge of its associated counterbore will establish communication between the chambers and the return port 38 via the central portion of the bore 96 and passage 130.

With the ports of the control valve 10 in the position shown in the drawing, the valve is in hydraulic balance. This is the neutral or center position of the valve. Fluid pressure enters the inlet port 42, passes through the overlapping channels and out the return port 38.

Movement of the valve member 18 to the right tends to restrict communication between annular channels 20 and 32 and increase communication between annular channels 22 and 36. Since annular channel 20 is connected to chamber 54 via the regulating valve means 94, pressure in chamber 54 will be reduced. Also since annular channel 22 is connected to the chamber 50 via regulating valve means 92, pressure in chamber 50 will increase. The pressure in chamber 50 opposes movement of the valve member 18 to the right thereby causing a reaction force to be transmitted to the operator of the vehicle, through the ball stud 12.

As explained in S. I. MacDuff's application Serial No. 457,836, if the resistance offered to steering becomes sufficiently great to cause the pressure required for power assistance to exceed a predetermined value, regulating valve 92 will come into action, shutting off communication between the chamber 50 and the annular channel 22. From this time on, the reaction or "feel" transmitted to the operator will remain the same regardless of an increase in the pressure in the annular channel 22. If during the steering operation there should be any decrease or increase in pressure in the chamber 50 the valve element 104 will shift to the right or left respectively in order to maintain the pressure in the chamber at the predetermined value.

For movement of the valve member 18 to the left, regulating valve means 94 will control the pressure in reaction chamber 54 in a similar manner. The advantages of my invention may be used with or without reaction limiting.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. In a power steering system having manually operated means and movable means responsive to movement of said manually operated means, a control valve of the open center type comprising a housing connected to the movable means, an inlet, a return, and two cylinder ports in said housing, a valve member having a neutral position in the housing wherein flow is established between all of the ports and from which position said member is movable for controlling flow between said ports, said valve member being operatively connected to the manually operated means, pressure reaction means within said housing for opposing relative movement of said valve member, said pressure reaction means comprising reaction chambers on one end of said valve member, passage means communicating said inlet port with said reaction chambers for transmitting variable inlet pressures to said reaction chambers, a reaction member adjacent and connected to said valve member for separating said reaction chambers, said reaction member having reaction areas subject to the variable pressures in said chambers and providing positive engagement with said housing for moving said housing and movable means when the valve member has been shifted to the limit of its movement.

2. In a power steering system having manually operated means and movable means, a control valve comprising a housing member having a bore therein, said housing being connected to the movable means, a valve member movable in opposite directions from a normally neutral or center position within said bore, said valve member being operatively connected to the manually operated means, annular channels formed in said bore and on said valve member, an inlet port, an outlet port, two cylinder ports, said annular channels being arranged in overlapping relationship and in communication with said ports, a reaction member located within said housing member and connected to one end of said valve member, passage means communicating said inlet port with said reaction member, said reaction member being subject to variable inlet pressures for opposing movement of said valve member and providing positive contact with said housing for moving said housing and movable means when the valve member has been shifted to the limit of its movement.

3. In a power steering system having manually operated means and movable means, a control valve comprising a housing member connected to the movable means, said housing member having inlet, return and cylinder ports, a movable valve member located within said housing member, said valve member being operatively connected to said manually operated means, pressure reaction means within said housing member and on one end of said valve member for opposing relative movement between said housing member and said valve member, said pressure reaction means including reaction chambers communicating with said inlet port, a reaction member separating said chambers, said reaction member being connected to said valve member and providing positive engagement with said housing member for moving said housing member and movable means when the valve member has been shifted to the limit of its movement.

References Cited in the file of this patent

UNITED STATES PATENTS

| | | |
|---|---|---|
| 2,292,325 | Lawler | Aug. 4, 1942 |
| 2,313,704 | Hey | Mar. 9, 1943 |
| 2,345,531 | De Ganahl | Mar. 28, 1944 |
| 2,530,659 | Hill | Nov. 21, 1950 |
| 2,667,181 | Ashton | Jan. 26, 1954 |
| 2,681,045 | Klessig | June 15, 1954 |
| 2,690,192 | Dannhardt | Sept. 28, 1954 |
| 2,757,748 | MacDuff | Aug. 7, 1956 |

FOREIGN PATENTS

| | | |
|---|---|---|
| 668,388 | France | July 9, 1929 |